United States Patent [19]
Moir et al.

[11] Patent Number: 5,828,518
[45] Date of Patent: Oct. 27, 1998

[54] DISC CENTERING SLEEVE FOR A DISC DRIVE

[75] Inventors: Michael Bruce Moir, Newbury Park; Richard Gene Krum, Thousand Oaks, both of Calif.

[73] Assignee: Seagate Technology, Inc., Scotts Valley, Calif.

[21] Appl. No.: 767,710

[22] Filed: Dec. 17, 1996

Related U.S. Application Data

[60] Provisional application No. 60/008,750, Dec. 18, 1995.
[51] Int. Cl.$^6$ ................................................. G11B 17/02
[52] U.S. Cl. ..................................... 360/99.12; 360/99.08
[58] Field of Search ............................. 360/99.12, 98.08

[56] References Cited

U.S. PATENT DOCUMENTS

| | | | |
|---|---|---|---|
| 5,367,418 | 11/1994 | Chessman et al. | 360/99.12 |
| 5,436,775 | 7/1995 | Ishimatsu | 360/98.08 |

*Primary Examiner*—John H. Wolff
*Attorney, Agent, or Firm*—Edward P. Heller, III; Raghunath S. Minisandram

[57] ABSTRACT

A disc pack assembly is provided for use within a disc drive having a spindle motor assembly rotatable about a central axis, with a spindle hub and a hub flange. A disc centering sleeve of the current invention with an inner raised portions and outer raised portions is placed around the spindle hub. An information storage disc is stacked on the spindle hub and rests on the hub flange. A disc spacer is placed on top of the information storage disc. A disc clamp is used to secure the information storage disc to the spindle hub. The inner raised portions abut against the outer surface of the spindle hub and the outer raised portions abut against the inner surface of the information storage disc and the disc spacer, centering the information storage disc and the disc spacer concentric with the central axis. In specific embodiments, the inner raised portions and the outer raised portions are alternatively positioned along the circumference of the disc centering sleeve and further, the inner raised portions and outer raised portions are alternatively positioned equidistant from each other.

6 Claims, 3 Drawing Sheets

DISC CENTERING SLEEVE FOR A DISC DRIVE

This application claims the benefit of provisional application Ser. No. 60/008,750 filed on Dec. 18, 1995, entitled Disc Clamp and Spacer.

The present invention relates generally to a disc centering device for positioning and retaining rotational information storage discs and spacers concentric to the axis of rotation, within a disc drives.

BACKGROUND OF THE INVENTION

Disc drive machines record and reproduce information stored on a recording media. Conventional Winchester-type disc drives include a plurality of vertically-aligned, rotating information storage discs, each having at least one associated magnetic head that is adapted to transfer information between the disc and an external computer system. The information storage discs are journaled about a spindle motor assembly capable of rotating the discs at high speeds. The heads are carried by a plurality of vertically-aligned, elongated flexure arms that in turn are carried by a head positioner assembly. The head positioner assembly is adapted to move the heads back and forth in unison across the face of the vertically-aligned, elongated flexure arms that in turn are carried by a head positioner assembly. The head positioner assembly is adapted to move the heads back and forth in unison across the face of the vertically-aligned discs. The head positioner assembly are traditionally either rotationally mounted, or take the form of a carriage that is free to move back and forth along a single axis. In either case, the head positioner assembly is adapted to precisely position the heads relative to the magnetic information storage discs.

The spindle motor assembly includes a rotatable spindle hub that is carried by a fixed spindle shaft securely mounted to the housing. A plurality of information storage discs are journaled about the spindle hub. Spacer discs are provided between adjacent information storage discs. The vertically aligned information storage discs are clamped to the spindle hub by a disc clamp secured by a plurality of screws or other means.

Due to advances in read/write heads, head positioner control and servo systems, the density of the data tracks have substantially increased from about 500 tracks per inch (TPI) to over 3000 TPI, allowing smaller diameter disks while increasing storage capacity. Because of this increased track density, however, the importance of rotational trueness of the spindle and information storage discs about a longitudinal axis thereof is magnified. Any wobble, deflection or non-repetitive run-out caused by an imbalanced or offset overall center of gravity from the longitudinal axis can significantly and adversely affect tracking performance. Thus, the spindle motor with plurality of information storage discs secured to the spindle motor hub, such an assembly typically known as disc pack is spin balanced in a manner reducing the combined moment of inertia thereof about the axial axis of rotation to within an acceptable tolerance. Typically weights are added to specific location on the disc pack during spin balancing to correct for any imbalances.

It is well known in the industry to use a centering tool to approximately center the information storage discs and spacers during assembly process and then install a disc clamp which applies a clamp load to hold the information storage discs and spacers in place. Unfortunately, either during the removal of the centering tool or application of clamp load, the information storage discs or the spacers can radially move, thus contributing to the imbalance of a disc pack.

Another way to minimize the imbalance is to have minimal gap between the spindle hub and the inner diameter of the information storage discs. However, in practice, if the information storage discs and the spindle hub physically touch each other, the overall thermal characteristics of the disc pack may be affected. Further, as the disc drives are built to withstand higher operating and non-operating shocks, there is a need to provide some sway space between the information storage discs and the spindle hub.

Further, as alternate clamping means are devised to accommodate for smaller information storage discs, it many not be always possible to use a removable disc centering tool during the assembly process.

Thus, there is a need to come up with a device for use in a disc drive that maintains the information storage discs and spacers concentric with the rotational axis of the disc pack during and after the assembly process.

There is also a need to use a disc centering device that can act as a compliant member between the information storage discs and the spindle hub.

There is also a need to use a disc centering device that can virtually eliminate need for spin balancing a disc pack using weights.

SUMMARY OF THE INVENTION

Accordingly, it is an objective of the present invention to provide a novel disc centering device that positions maintains the information storage devices and the spacers concentric with the axis of rotation of the spindle hub.

It is a further object of this invention to provide a compliant member between the information storage discs and reduce the amount of time required to assemble a disc pack.

To achieve the foregoing and other objects in accordance with the purpose of the present invention, a disc pack assembly is provided for use within a disc drive having a spindle motor assembly rotatable about a central axis, with a spindle hub and a hub flange. A novel disc centering sleeve of the current invention is placed around the spindle hub. An information storage disc is stacked on the spindle hub and rests on the hub flange. A disc spacer is placed on top of the information storage disc. The novel disc centering sleeve has selective inner raised portions that abut against the outer surface of the spindle hub. The novel disc centering sleeve further having selective outer raised portions that abut against the inner surface of the information storage disc and the disc spacers. The selective inner raised portions and selective outer raised portions are alternatively positioned along the circumference of the disc centering sleeve. Further, the selective inner raised portions and selective outer raised portions are positioned equidistant from each other along the circumference of the disc centering sleeve. The selective outer raised portions exert a radial force to maintain the information storage discs and the spacers concentric about the central axis. A disc clamp is used to secure the information storage discs to the spindle motor.

DETAILED DESCRIPTIONS

Figure 1:
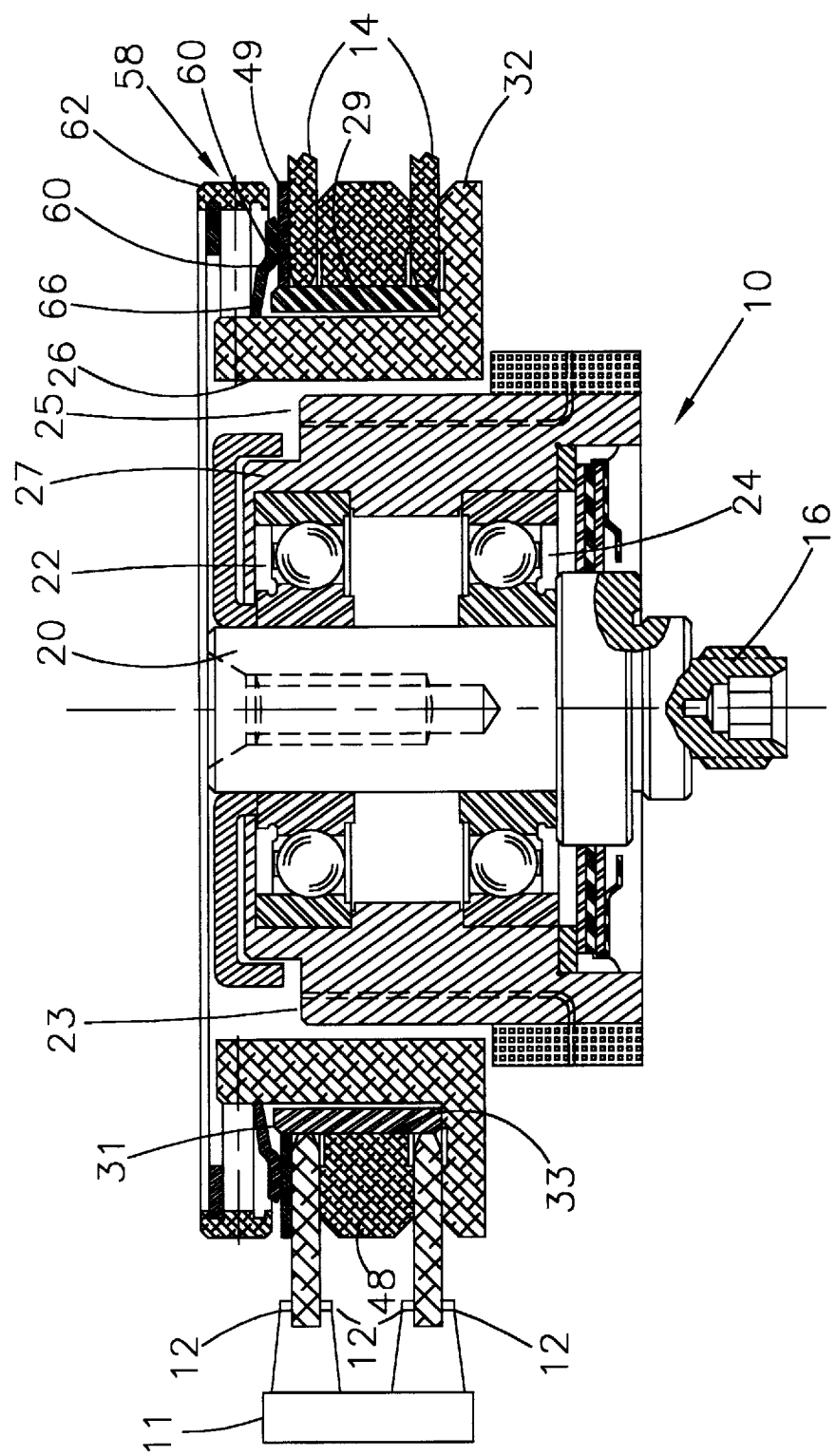
FIG. 1 is a sectional elevational view through a partial disc drive unit showing disc centering sleeve of the present invention.

As is generally known in the art, the illustrative disc drive unit 10 includes a head positioner assembly 11 mounted within the housing 16 at a position along the disc stack. The head positioner assembly 11 supports a plurality of individual arms having electro-magnetic transducer heads 12 at the distal ends there of in close proximity with respective upper and lower surfaces on the information storage disks. A suitable actuator motor (not shown) such as a movable coil DC motor, and a corresponding motor controller function to displace the magnetic transducer head through generally radial traverses relative to the information storage disks 14 for the purposes of reading and writing data, all in a well known manner.

With reference to FIG. 1, a central shaft 20 having a central axis L—L is securely fixed to a portion of the housing lower base 16, and the information storage disks 14 are mounted for rotational movement within the housing 16 about the shaft 20. Central shaft 20 is also attached to the inner races of upper bearing and lower bearing.

The outer races of the upper bearing 22 and the lower bearing 24 support the rotor of the spindle motor 23. The rotor 25 includes sleeve 27 and spindle hub 26. Sleeve 27 is preferably stainless steel and spindle hub 26 is preferably aluminum. Spindle hub 26 is preferably heated and shrink fit over the outer surface of the sleeve 27 to securely attach spindle hub 26 and sleeve 27. The sleeve has a radially and inwardly extending middle flange on which the outer races of the upper bearing 22 and lower bearing 24 rest. The sleeve supports, at its lower end, a plurality of permanent magnets which interact with an electromagnetic stator core to rotate the spindle hub about the center shaft in a known manner.

The spindle hub near the lower end, has a radially and outwardly extending hub flange 32. A novel disc centering sleeve 29 of the current is slid over the spindle hub 26, features of which are briefly explained here and will be fully explained below. The novel disc centering sleeve 29 further having selective inner raised portions 31 and selective outer raised portions 33. The selective inner raised portion 31 abuts against the outer surface of the spindle hub 26. A first information storage disc 14 is stacked on top of the hub flange 32. A disc spacer 48 is stacked on top of the first information disc and a second disc 14 is stacked on top of the disc spacer 48. A circular support ring 49 is placed on top of the second information storage disc. The selective outer raised portions 33 of the disc centering sleeve 29 radially push and center the information storage discs, the disc spacer and the support ring so that they are all positioned concentric with the central shaft and about the central axis, thus aiding in maintaining a balanced load along the central axis.

A disc clamp assembly 58 including a clamp ring 60 and a grip ring 62 secure the information storage discs to the spindle hub is shown. The features and operation of the disc clamp assembly 58 will be explained now, however, one skilled in the art would readily recognize that alternate disc clamp assemblies could be used to secure the information storage discs to the spindle hubs, while using the novel disc centering sleeve of the current invention. The clamping ring 60 is a stamped sheet metal part. The clamping ring 60 has an inner diameter larger than the outer diameter of the spindle hub 26, so that the clamping ring 60 can be slipped over the spindle hub 26 and rest on the top surface of the support ring 49. The clamping ring 60 further having a rounded convex surface 64 near the outer periphery, so that the clamp force is applied away from the inner diameter of the information storage discs 14. The clamping ring further having a raised inner portion 66 on which the lower surface of the grip ring 62 rests.

The grip ring 62 is an extruded and machined part. The grip ring 62 inside diameter is smaller than the diameter of the spindle hub 26, however the grip ring 62 is resilient so that it can be mechanically expanded radially to a point below its yield strength, and larger than the outer diameter of the spindle hub 26. The grip ring 62 further having a means for receiving such a radial force. The grip ring 62 further having a means for receiving an axial force. During assembly process, the grip ring 62 is radially expanded and slid over the spindle hub 26 and while still maintaining the radial force, an axial force is applied to the clamping ring 60 and the disc pack until there is no further movement of the disc pack. While still maintaining the axial force, the radial force is removed so that the grip ring 62 can grip the spindle hub 26 and continue to maintain the axial force.

Figure 2:
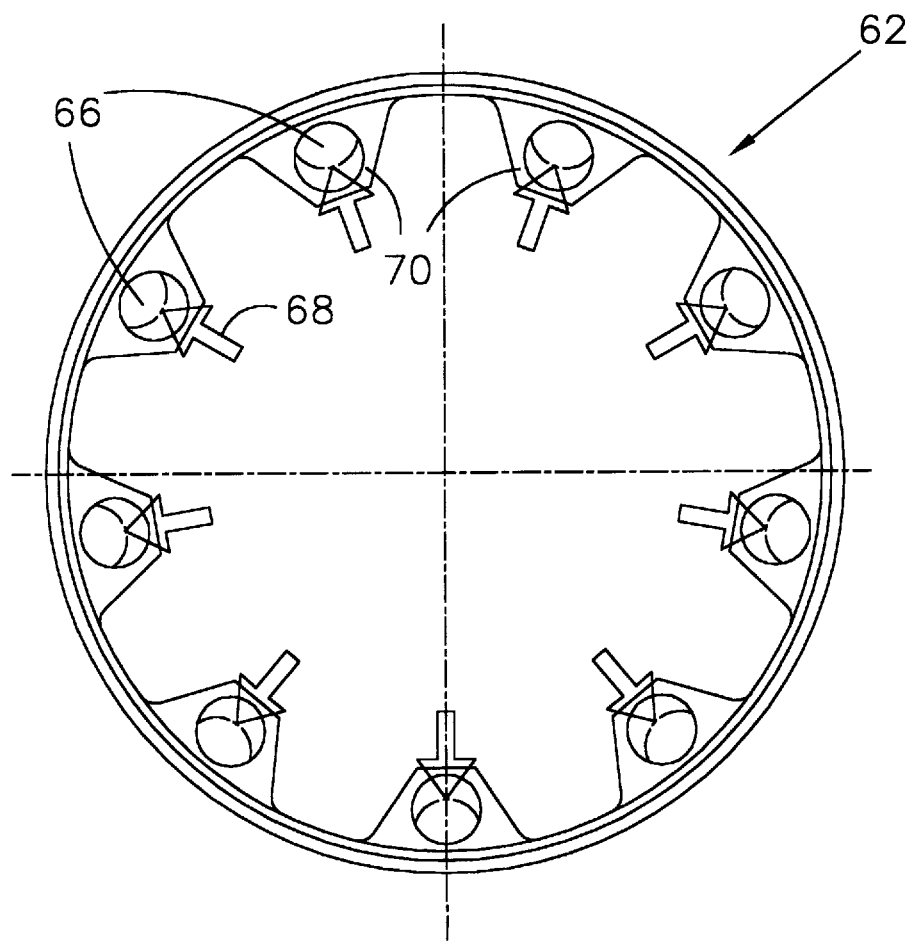
FIG. 2 is a plan view for use with the grip ring of the present invention.

FIG. 2 is a plan view of the grip ring 62. The figure shows plurality of slots 66 to receive tips of a tool capable of applying radial and axial force. The arrows 68 represent the direction of application of radial force. The grip ring further includes a middle portions 70 to receive the axial force applied to the disc pack. The lower surface of the middle portion 70 rests on the inner portion 66 of the clamping ring 60.

Figure 3:
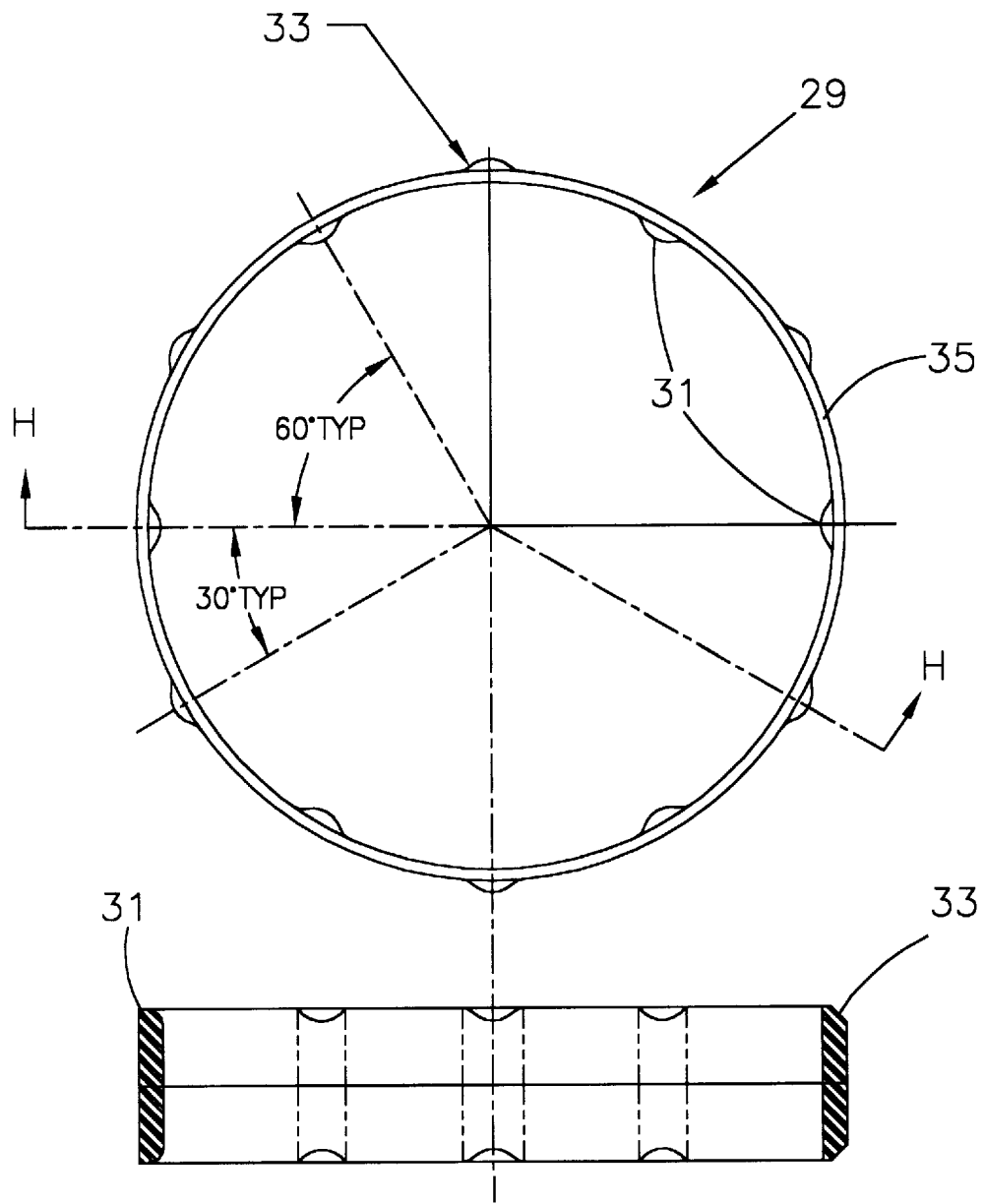
FIG. 3 is a plan and sectional elevational view of disc centering sleeve of the present invention.

FIG. 3 shows a plan and sectional elevational view along the lines H—H of the novel disc centering sleeve 29 of the present invention. The disc centering sleeve 29 has a circular wall portion 35, plurality of inner raised portions 31 and plurality of outer raised portions 33. The inner raised portions 31 and the outer raised portions 33 alternate around the circumference of the disc centering sleeve. Further, the inner raised portions 31 and the outer raised portions 33 are located equidistant from each other. For example, as shown in the figure, six outer raised portions are located such that the included angle created by lines drawn from the center of the disc centering sleeve 29 to the middle of the outer raised portions 33 of two adjacent outer raised portions will be 60 degrees. Further, the inner raised portions 31 are located with respect to an adjacent outer raised portion 33 such that the included angle created by lines drawn from the center of the disc centering sleeve 29 to the middle of an outer raised portions 33 and an adjacent inner raised portion will be 30 degrees. The disc centering sleeve 29 is made of an elastic material, such as plastic, that can be molded or machined. The disc centering sleeve 29 provides a radial force between the spindle outer diameter and the inner diameter of the information storage discs. By placing the outer raised portions and the inner raised portions equidistant, the radial force applied will be equal. The thickness of the wall 35 is chosen such that it can provide the spring force necessary to center the information storage discs, the disc spacers and the support ring. The diameter of the disc centering sleeve and the height of the raised inner portion are chosen such that when the disc centering sleeve is inserted over the spindle hub, the inner raised portions abut against the outer surface of the spindle hub and create a tension in the wall section between the inner raised portions. When the information storage discs, spacers and the support ring are inserted over the disc centering sleeve, the outer raised portions exert an equal radial force along the circumference of the disc centering sleeve and forcing the information storage discs, disc spacers and the support ring concentric with the central axis.

From the above description, it is apparent that many modifications and variations of the present invention are possible in light of the above teachings. It is therefore to be understood that, within the scope of the appended claims, the invention may be practiced otherwise than as specifically described hereinabove.

We claim:

1. A disc pack assembly comprising:
    a spindle motor rotatable about a central axis, said spindle motor having a spindle hub with a hub flange;
    at least one information storage disc stacked on said spindle hub and resting on said hub flange;
    a disc spacer stacked on top of said information storage disc;
    a disc clamp to secure said information storage disc to said spindle hub;
    a disc centering sleeve located between said spindle hub and said information storage disc, inner raised portions of said disc centering sleeve abutting against outer surface of said spindle hub and selective outer raised portions of said disc centering sleeve abutting against inner diameter of said information storage disc and said disc spacer.

2. The disc pack of claim 1, wherein said inner raised portions and outer raised portions of said disc centering sleeve are alternately positioned along the circumference of the disc centering sleeve.

3. The disc pack of claim 2, wherein said inner raised portions and outer raised portions of said disc centering sleeve are alternately positioned equidistant from each other along the circumference of the disc centering sleeve.

4. A disc drive system comprising:
    a plurality of magnetic transducer heads for writing information onto the information storage discs and for reading information out from the information storage discs;
    a head positioner assembly for positioning the transducer heads relative to the information storage discs;
    disc pack assembly comprising:
        a spindle motor rotatable about a central axis, said spindle motor having a spindle hub with a hub flange;
        at least one information storage disc stacked on said spindle hub and resting on said hub flange;
        a disc spacer stacked on top of said information storage disc;
        a disc clamp to secure said information storage disc to said spindle hub;
        a disc centering sleeve located between said spindle hub and said information storage disc, inner raised portions of said disc centering sleeve abutting against outer surface of said spindle hub and outer raised portions of said disc centering sleeve abutting against inner diameter of said information storage disc and said disc spacer.

5. The disc drive of claim 4, wherein said inner raised portions and outer raised portions of said disc centering sleeve are alternately positioned along the circumference of the disc centering sleeve.

6. The disc drive of claim 5, wherein said inner raised portions and outer raised portions of said disc centering sleeve are alternately positioned equidistant from each other, along the circumference of the disc centering sleeve.

* * * * *